June 24, 1930.  E. A. ZEH  1,767,108
METHOD AND APPARATUS FOR COLORING THIN GLASS BODIES
Filed March 16, 1928
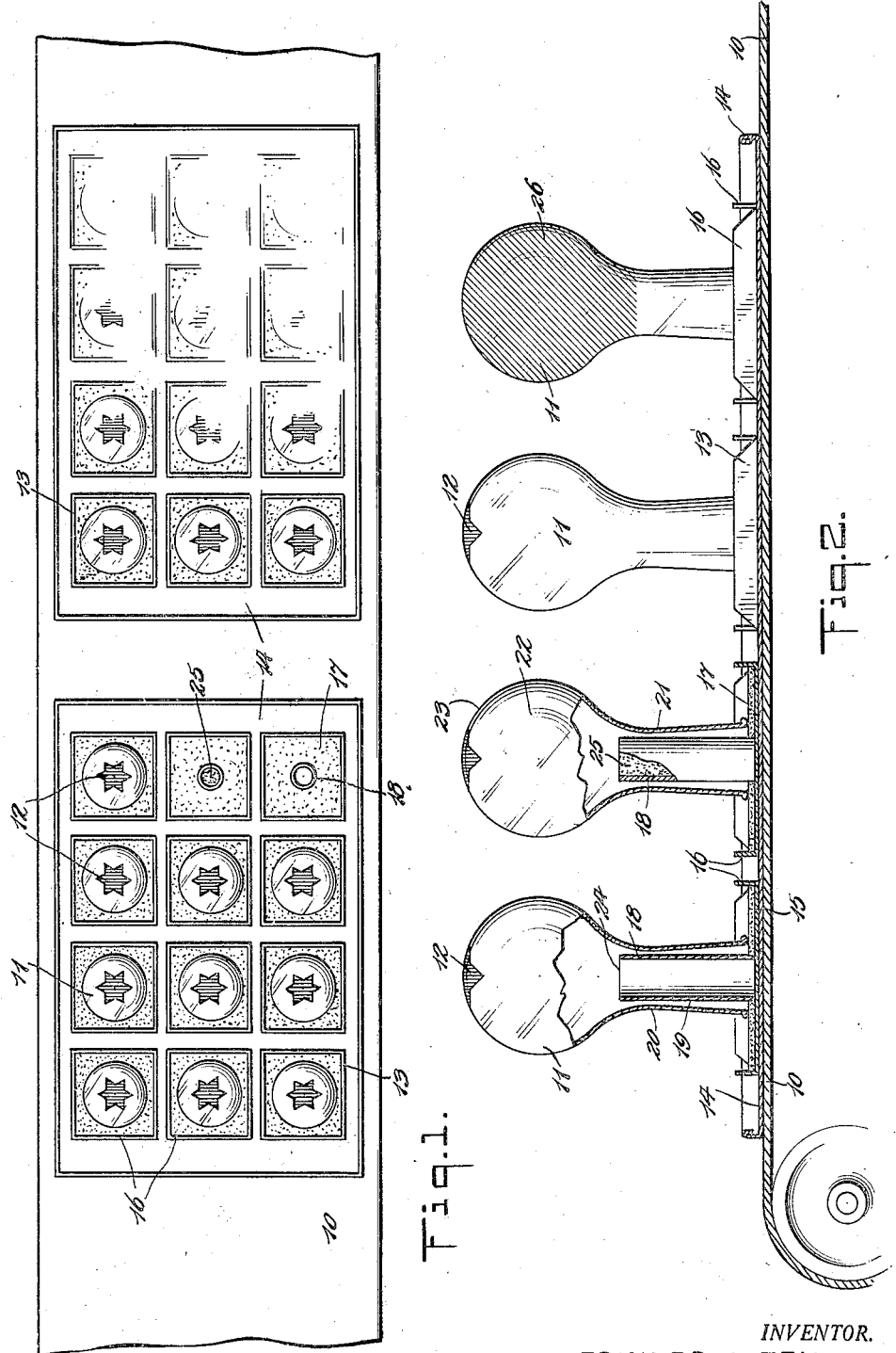
INVENTOR.
EDWARD A. ZEH
BY
Warren S. Orton
ATTORNEYS.

Patented June 24, 1930

1,767,108

UNITED STATES PATENT OFFICE

EDWARD A. ZEH, OF PASSAIC, NEW JERSEY, ASSIGNOR TO ZEH, INCORPORATED, OF CLIFTON, NEW JERSEY, A CORPORATION OF NEW JERSEY

METHOD AND APPARATUS FOR COLORING THIN GLASS BODIES

Application filed March 16, 1928. Serial No. 262,199.

The invention relates in general to a method and apparatus for use in fusing colors in some preformed design, hereinafter defined as a decalcomania, on thin glass bodies, such as electric light bulbs and radio tubes, without distorting the same from their original configuration. The present disclosure constitutes an improvement over the method disclosed in my copending application Serial No. 192,482 filed May 18, 1927.

In the following specification and in the claims, it is to be understood that the expression "decalcomania" is intended to cover any transfer picture, lettering, photograph, mark or other character or design formed by any decalcomania process, printed from type press, lithographing, photographing, electrotyping, or formed by hand painting or by any other method usual in forming designs in color.

In the copending application, it was suggested that when applying a decalcomania or a color to thin glass bodies the composition of the decalcomania or color had to be set to have a fusing point lower than the temperature at which the glass body shows a tendency to sag out of its normal, original configuration. From a practical standpoint, the success in practicing this suggested method depended largely upon the mode of procedure particularly in relation to the distribution of heat on to the thin glass body. The present disclosure features a controlling of the application of heat in such way as will attain the requisite softening of that portion of the bulb, tube or glass body to which the decalcomania or color is to be applied while minimizing the softening effect of the heat on the glass particularly the portion thereof which is designed to withstand the weight of the glass body. If the glass body should be subjected to the application of heat uniformly over its entire surface, there would result a softening of all of the parts. Under these conditions it is obvious that the lower, partially softened portion, and which are usually the portions not required to be in a fusible state to receive the decalcomania, have to withstand the weight of the parts of the glass object above the same. The lower weight supporting parts are thus unnecessarily subjected to a distorting action.

According, the primary object of the invention is to provide for the subjection of the bulb or other glass article to the action of heat in such a way as will localize the softening action of the heat to that portion which it is particularly desired to soften in order to receive the fused decalcomania or color and to minimize any softening effect on other portions not required to be softened, as for instance the lower portion which supports the article as a whole.

Primarily, this phase of the invention is attained, in the case of hollow objects like bulbs and tubes, by directing the heat towards the upper portion of the glass article, and absorbing heat from the lower portion of the same, thus permitting the lower portion to remain relatively cool and thus rigid.

Considered in its mechanical aspect, this phase of the invention is attained by mounting the bulb or other hollow glass article on a support and designing the support to have minimum heat conductivity. In the instant case, the support is a sheet of asbestos on which the stem of the electric light bulb rests.

The primary object of the invention considered from its mechanical aspect is to provide a simple form of carrier for the bulb or other hollow glass articles to be treated, which will support the article in upright position convenient for passage through the lehr or heating oven, which will cause the glass softening heat to be directed locally on the portion of the glass on which the decalcomania or color is positioned for fusing, and which will tend to minimize any sagging of the article under its own weight as it is passed through the heating oven or lehr.

Various other objects and advantages of the invention will be in part obvious from a consideration of the method features of the disclosure and from an inspection of the accompanying drawings and in part will be more fully set forth in the following particular description of one method of practicing the invention, and the invention also consists in certain new and novel modifications of the preferred method and other features of construction and combinations of parts hereinafter set forth and claimed.

In the accompanying drawing:

Fig. 1 is a fragmentary plan view showing a conveyor on which are positioned trays containing supports, illustrating a preferred embodiment of the invention, on some of which supports are positioned electric light bulbs having a decalcomania thereon; and Fig. 2 is a vertical sectional view taken longitudinally of the showing in Fig. 1 with some of the bulbs and associated trays shown in vertical section;

In the drawing there is shown a belt conveyor 10 of conventional design arranged to carry the articles to be fused into and through a lehr or other conventional form of heating device usually employed in the art of fusing decalcomanias and the like to glass bodies. It is the usual practice to heat a plurality of glass objects, such as the bulb 11 with its decalcomania 12, subjecting the same to heat conditions controlled by the fusing point of the decalcomania and the glass or, as featured in the above identified application, controlled by the sagging point of the glass body.

The bulbs 11 are separately mounted on supporting dishes 13 which in turn are mounted in a carrying tray 14. Each of the dishes 13 comprise a flat metallic plate 15, in the instant case formed of sheet iron, rectangular in plan, the edges of which are upturned to form strengthening flanges 16. Positioned in the rectangular dish thus formed is a layer 17 of asbestos or other heat insulating material. It is possible to employ the dishes with their asbestos covered glass receiving support as thus described and without any upstanding part in those cases where the glass object will not tilt over. If it be desired, however, to prevent accidental tipping over of top heavy articles, such as the bulbs shown herein, it is suggeted that the dishes be provided with some suitable means for maintaining the articles in upright position. For this purpose, an upstanding post 18 which may be made of wood or any material which will withstand the temperature conditions present during the firing operation may be disposed to extend upwardly from the dish and designed to intrude into the bulb or other article to be held.

The present disclosure features means which will function not only to hold the bulb upright but to prevent any such high heating of the stem or lower portion of the bulb as would cause it to lose its form maintaining rigidity. In the drawings, two means are illustrated for attaining this result. In one case, the post 18 is shown to be a hollow metallic cylinder preferably formed of sheet iron referred to hereinafter as a heat abstractor or absorber. The lower end of the tube 18 is secured to the plate 15 centrally thereof, extends through the asbestos layer 17 and projects upwardly for a varying distance depending upon the height and other dimensions of the bulb 11 designed to be installed thereon.

In constructing these cylindrical open top absorbers, it has been found advisable to minimize the heat capacity while increasing the radiating area. For this reason certain other forms of cast iron, clay and other materials capable of withstanding the high temperatures present were used but had to have a certain mass in order to withstand service conditions. With the requisite mass to give the necessary structural strength, such constructions apparently absorbed too much heat, and the desired area to be treated was not sufficiently heated. In one form of the invention it has been found that satisfactory results were obtained when the hollow cylindrical tubes were made with a thickness of material 19 substantially equal to the thickness of the glass wall 20 forming the bulb 11.

It was also found that the absorbers should extend through the stem 21 of the bulb and terminate within the bulbous part 22 and in spaced relation below the top 23. The length of the absorbers which will give the best result will depend upon numerous factors; the temperature at which the tubes are to be heated, the composition of the glass used, the fusing point of the fusible color forming the decalcomania, the time duration of the fusing and the like. In general, the extending of the absorbers into the bulbous part 22 is as indicated and any refinements in dimension will be dependent on whether there is a too extensive area of softening of the glass or a too rapid softening of the area covered by the delcalcomonia. The closer the open end 24 comes to the top 23 the more intense is the heating and the more limited is the area softened.

It is suggested that the metal tube 18 forming the post be filled, or partially filled with some substance having high heat receiving and storing capacity such for instance as plaster of Paris. In Fig. 2, one of the tubes 18 contains a plaster of Paris filler 25.

In operation, the decalcomania or other design, 12 or the glass color coating shown at 26, generically referred to in the claims as a decalcomania desired to be fused to the glass is positioned thereon following conventional practices, or as suggested in the above identified application. Each bulb with its decalcomania thereon is positioned inserted over one of the heat radiators or absorbers 18 with its stem end resting on the asbestos layer 17. The dishes are assembled in a tray and the tray fed conventionally to the travelling belt which carries the same into and through the heating oven following conventional practices in this respect. A temperature is maintained in the oven sufficiently high to cause the coloring matter in the decalcomania to fuse into the glass but care is exercised not to have the temperature so high as will cause the bulbs or other articles under treatment to sag out of their preformed normal shape and configuration.

In the case of the plaster of Paris filled absorbers, the mass of material apparently acts as a heat receiver, the capacity of which is of course regulated by the amount of filling in the tube 18.

Further, the positioning of the bulb on the layer seems to have the effect of cooling the lower portion of the bulb and this arrangement neutralizes the neutral tendency of such thin glass bodies to sag under their own weight, when subjected to a partial softening operation. The stem portions of these bulbs are maintained rigid at all times and when carefully controlled there is no evidence whatsoever of any distortion even under those conditions where it is found necessary to intensely heat the upper portion of the bulb on which the decalcomania is placed.

In the showing in the drawing, the entire bulbous part 22 is heated as in the instant case it is intended to color the entire bulbous part indicated at 26 in addition to fusing the decalcomania design 12 shown on the upper portion of a clear glass bulb. Should it be desired simply to heat the extreme upper part, a longer absorber should be used than is herein illustrated so as to bring the outlet 24 relatively close to the portion of the bulb covered by the decalcomania 12.

By practicing the method herein disclosed and using the apparatus illustrated, it is possible to apply color to glass of extremely thin dimension and to fuse the color to a thin unsupported wall without any noticeable sagging or distorting of the original configuration of the wall.

The method is particularly adapted for use in connection with large size articles which due to their weight are very apt to become distorted when heated at the temperature which must be employed in order to fuse into the glass certain compositions of glass color. The control of the heat to the desired parts of the glass body can be most accurately governed by the use of appropriately designed forms of internal absorbers. By suitably designed absorbers, the heat may be directed selectively to those portions of the glass body which are required to be heated and at the temperature necessary to cause the desired fusing while minimizing the application of the heat to those portions which are not required to be so intensely heated.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In the art of fusing a decalcomania to a thin hollow glass body, the method which consists in subjecting the glass body to heat at a temperature sufficiently high to cause the decalcomania to fuse into the glass and at a temperature less than the temperature at which the glass sags, while absorbing heat from the lower portion of the glass body thereby to minimize the tendency of the lower portion of the glass body to sag under its own weight.

2. In the art of fusing decalcomania to a glass body, the method which consists in subjecting the glass body with the decalcomania on an upper portion thereof to a temperature sufficiently high to cause the decalcomania to fuse into the glass while maintaining the base portion of the glass at a lower temperature.

3. In the art of fusing a decalcomania to the upper portion of a thin hollow glass body, the method which consists in exposing the exterior of the body as a whole to the action of heat, withdrawing heat from the lower portion of the interior of the body and heat-insulating the portion of the body which is in engagement with its support.

4. In the art of fusing color to the upper portion of a thin, hollow glass body without distorting the original configuration of the glass body, the method which consists in exposing the exterior of the body as a whole to the action of heat at a temperature sufficiently high to cause the color to fuse into the glass while abstracting heat from the interior lower portion of the glass body at a rate sufficiently fast to insure the maintenance of the lower portion of the body with a rigidity sufficient to support the body from sagging under its own weight.

5. In the art of fusing decalcomania to the upper portion of a thin hollow glass body, the method which consists in exposing the exterior of the body as a whole to the action of heat, while abstracting heat from the lower portion of the glass body, regulating the supply of heat to the upper portion to provide a temperature sufficiently high to cause the decalcomania to fuse into the glass and regulating the rate of abstraction of heat from the lower portion to prevent such a softening of the lower portion as would cause the body to sag under its own weight.

6. In a device of the class described, the combination of a hollow body formed of a thin glass wall, a carrier therefore comprising a sheet iron plate on which the body is supported, said plate provided with a sheet iron cylindrical heat abstractor upstanding from the plate, and secured thereto, said abstractor extending upwardly into the interior of the body and with its upper end spaced downwardly from the top of the body, the thickness of the metal forming the abstractor being approximately equal to the thickness of the glass wall.

7. A bulb supporting device comprising a sheet metal plate having its edges upturned to provide strengthening flanges, a cylinder of thin metal secured at its lower end to the plate, projecting upwardly therefrom and adapted to intrude into the bulb, and a layer of heat insulating material providing a support for the bulb, said layer fitted on the plate between the flanges and through which the cylinder extends.

8. In a device for fusing color to hollow glass objects including a metallic base member, an upstanding metallic heat absorber adapted to intrude into the interior of the article to be heated and an asbestos covering adapted to provide a support for the article to be heated.

9. A support for heating glass electric light bulbs and the like, comprising a heat insulating member adapted to support the open end of the bulb and a heat absorbing element projecting therefrom and adapted to be intruded through the open end and into the interior of the bulb.

10. In a device for use in fusing color to thin hollow glass articles, the combination of an article support formed of heat insulating material and a heat absorbing element which, projecting upwardly therefrom, is adapted to intrude into the interior of the article when resting on the heat insulating support.

11. A device for use in fusing decalcomania to hollow glass articles comprising a support for the article including an asbestos facing on which the article is to be supported.

12. A device for use in fusing decalcomania to hollow glass articles, comprising a support for receiving the article, and heat absorbing means adapted to be intruded into the interior of the article for abstracting heat from the part of the article adjacent said means.

13. A device for use in fusing decalcomania to hollow glass articles, comprising a support, an upstanding post adapted to extend into the interior of the article to maintain it in upstanding position while being heated, said post having capacity to receive and store heat from the portion of the article adjacent the same.

14. A device for use in fusing decalcomania to a hollow glass body, including a metal cylinder adapted to extend into the interior of the body while being heated, and a filler of heat absorbing material in said cylinder.

Signed at Clifton in the county of Passaic, and State of New Jersey this 6th day of February A. D. 1928.

EDWARD A. ZEH.